United States Patent
Kim et al.

(10) Patent No.: US 8,948,073 B2
(45) Date of Patent: Feb. 3, 2015

(54) METHOD AND APPARATUS FOR MANAGING CARRIER OF MULTICAST AND BROADCAST SERVICE

(75) Inventors: Eunkyung Kim, Seoul (KR); Jae Sun Cha, Daejeon (KR); Soojung Jung, Daejeon (KR); Sung Cheol Chang, Daejeon (KR); Hyun Lee, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 377 days.

(21) Appl. No.: 13/040,811

(22) Filed: Mar. 4, 2011

(65) Prior Publication Data

US 2011/0228717 A1 Sep. 22, 2011

(30) Foreign Application Priority Data

Mar. 4, 2010 (KR) .................. 10-2010-0019591
Mar. 4, 2011 (KR) .................. 10-2011-0019370

(51) Int. Cl.
*H04H 20/71* (2008.01)
*H04L 12/58* (2006.01)
*H04W 76/00* (2009.01)
*H04W 36/06* (2009.01)
*H04W 72/00* (2009.01)
*H04W 76/04* (2009.01)

(52) U.S. Cl.
CPC ............. *H04L 51/38* (2013.01); *H04W 76/002* (2013.01); *H04W 36/06* (2013.01); *H04W 72/00* (2013.01); *H04W 76/046* (2013.01)
USPC ....................................... 370/312

(58) Field of Classification Search
CPC ....... H04L 69/16; H04L 69/161; H04L 69/22; H04L 69/166
See application file for complete search history.

(56) References Cited

U.S. PATENT DOCUMENTS

2009/0109890 A1* 4/2009 Chow et al. ............ 370/312
2012/0294222 A1* 11/2012 Kim et al. ............ 370/312

OTHER PUBLICATIONS

Proposed Text Related to primary carrier change for the IEEE 802.16m/D2 (15.2.8.2.11), Nov. 6, 2009, IEEE.*
Kim, "Proposed Text on the E-MBS Operation in Alternative Carrier in IEEE P802.16m (16.9.2)," Mar. 5, 2010, IEEE.*

* cited by examiner

Primary Examiner — Jae Y Lee
(74) Attorney, Agent, or Firm — NSIP Law

(57) ABSTRACT

A method of managing carriers in a terminal of a multi-carrier system is provided. The method includes switching from a primary carrier to an MBS carrier for an MBS, receiving MBS-associated data from a base station through the MBS carrier, returning to the primary carrier from the MBS carrier after receiving the MBS-associated data, and communicating with the base station through the primary carrier.

22 Claims, 6 Drawing Sheets

METHOD AND APPARATUS FOR MANAGING CARRIER OF MULTICAST AND BROADCAST SERVICE

CROSS-REFERENCE TO RELATED APPLICATION

This application claims priority to and the benefit of Korean Patent Application No. 10-2010-0019591 and No. 10-2011-0019370 filed in the Korean Intellectual Property Office on Mar. 4, 2010 and Mar. 4, 2011, respectively, the entire contents of which are incorporated herein by reference.

BACKGROUND (a) Field

The present invention generally relates to a method and an apparatus for managing a carrier of a multicast and broadcast service (MBS).

(b) Description of the Related Art

The MBS is a point-to-multipoint transmission scheme for concurrent transport of data packets from a source to a plurality of destinations. A broadcast service is a service where data packets are transmitted to all users, and a multicast service is a service where data packets are transmitted to users belonging to a specific group.

In a wireless access system supporting multi-carrier (hereinafter referred to as "a multi-carrier system"), two types of carriers exist in a position of a terminal. One is a primary carrier for transmitting traffic and a control signal between a base station and the terminal. The other is a secondary carrier that is an additional carrier for the primary carrier. The secondary carrier is used to transmit the traffic, or a special instruction or rule notified through the primary carrier is applied to the secondary carrier.

The terminal may switch a physical layer connection from the primary carrier to the secondary carrier by instruction of the base station. This is called carrier switching. The terminal returns to the primary carrier after being connected to the secondary carrier for a predetermined time, and does not communicate with the base station through the primary carrier while staying on the secondary carrier.

In an MBS service, the terminal may receive MBS-associated data through an MBS carrier corresponding to the secondary carrier. In this case, MBS configuration information is transmitted from the terminal to the base station through an MBS configuration (MBS-CFG) message. The terminal receives the MBS configuration information and an MBS MAP, and acquires a time when content of the joined MBS is transmitted through the MBS MAP. The base station may clearly notify the terminal of a transmission time of the MBS configuration, or the terminal may blindly recognize the transmission times. That is, when the terminal joins the MBS to initially receive the service, the base station notifies the terminal of the transmission time of the MBS-CFG message or transmits the MBS-CFG message at the predetermined time. The terminal can analogize or recognize the transmission time of the MBS MAP through the MBS-CFG message or recognize the transmission time of the content through the MBS MAP.

As such, the terminal can recognize the time for receiving the MBS-associated data, thereby recognizing a time for switching to the MBS carrier. However, when the terminal simultaneously receives the MBS service and a general service, the terminal cannot recognize a time for returning to the primary carrier for receiving the general service.

SUMMARY

Aspects of the present invention provide a carrier managing method and apparatus for allowing a terminal to recognize a time when it returns to a primary carrier.

According to an aspect of the present invention, a method of managing carriers in a terminal of a multi-carrier system is provided. The method includes switching from a primary carrier to an MBS carrier for an MBS, receiving MBS-associated data from a base station through the MBS carrier, returning to the primary carrier from the MBS carrier after receiving the MBS-associated data, and communicating with the base station through the primary carrier.

The MBS-associated data may include at least one among an MBS configuration message including MBS configuration information, an MBS MAP, and MBS content. The MBS configuration message may further include information on the MBS MAP, and the MBS MAP may include information on the MBS content.

Switching to the MBS carrier may include switching to the MBS carrier at a time corresponding to a superframe, a frame, or a subframe when the MBS configuration message is transmitted.

Returning to the primary carrier may include returning to the primary carrier after receiving the MBS configuration message or after the MBS configuration message is received and a threshold period passes.

Returning to the primary carrier may include returning to the primary carrier after receiving the MBS MAP or after the MBS MAP is received and a threshold period passes.

Returning to the primary carrier may include returning to the primary carrier after receiving the MBS content or after the MBS content is received and a threshold period passes.

Receiving the MBS-associated data may include receiving the MBS configuration message and the MBS MAP while staying on the MBS carrier.

Receiving the MBS-associated data may include receiving the MBS configuration message, the MBS MAP, and the MBS content while staying on the MBS carrier.

The MBS-associated data may further include a field for a time when the terminal returns to the primary carrier.

The method may further include receiving a message including at least one of a time when the terminal switches to the MBS carrier and a time when the terminal returns to the primary carrier, from the base station.

The terminal may switch to the MBS carrier and return to the primary carrier based on a certain pattern.

According to another aspect of the present invention, a method of managing carriers of a terminal in a base station of a multi-carrier system is provided. The method includes transmitting MBS-associated data to a terminal as the terminal switches from a primary carrier to an MBS carrier for the MBS, and communicating with the terminal through the primary carrier as the terminal returns to the primary carrier from the MBS carrier after receiving the MBS-associated data.

The method may further include managing a period in which the terminal returns to the primary carrier after switching to the MBS carrier based on a certain pattern.

The method may further include managing the carriers such that the terminal returns to the primary carrier after receiving the MBS-associated data.

The method may further include managing the carriers such that the terminal returns to the primary carrier after the terminal receives the MBS-associated data and a threshold period passes.

The MBS-associated data may include a field for a time when the terminal returns to the primary carrier.

The method may further include transmitting a message including at least one of a time when the terminal switches to the MBS carrier and a time when the terminal returns to the primary carrier, to the terminal.

According to yet another aspect of the present invention, an apparatus for managing carriers in a terminal of a multi-carrier system is provided. The apparatus includes a controller and a receiver. The controller switches from a primary carrier to an MBS carrier for an MBS based on a transmission time of MBS-associated data, and returns to the primary carrier from the MBS carrier after receiving the MBS-associated data. The receiver receives the MBS-associated data from the base station through the MBS carrier, and receives data from the base station through the primary carrier.

The controller may return to the primary carrier based on at least one among a time when the terminal has received the MBS-associated data, a time when the terminal receives the MBS-associated data and a threshold period passes, a time included in the MBS-associated data, a time included in a message transmitted from the base station, and a time according to a pattern defined by the base station.

DETAILED DESCRIPTION

Figure 1:
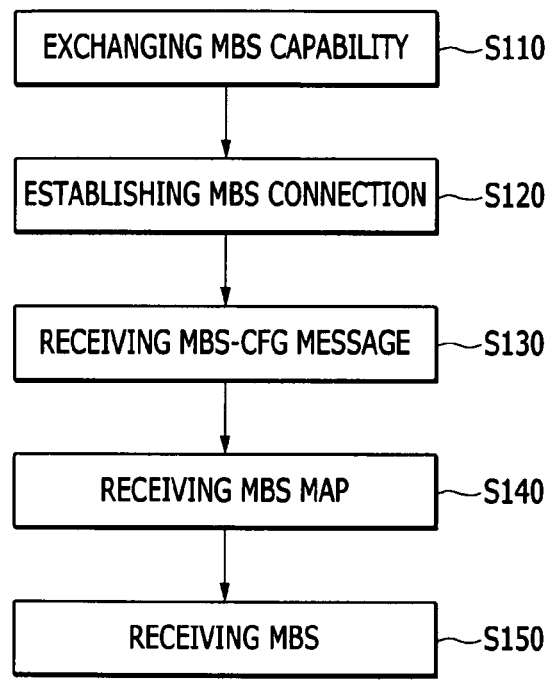
FIG. 1 is a flowchart showing an MBS supporting method according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term terminal may designate a mobile terminal (MT), a mobile station (MS), a subscriber station (SS), a portable subscriber station (PSS), an access terminal (AT), user equipment (UE), and so on, or may include all or some functions thereof.

Further, the term base station (BS) may designate a node B, an evolved node B (eNodeB), an access point (AP), a radio access station (RAS), a base transceiver station (BTS), an MMR (mobile multihop relay)-BS, and so on, or may include all or some functions thereof.

FIG. 1 is a flowchart showing an MBS supporting method according to an embodiment of the present invention.

Referring to FIG. 1, a terminal transmits information on MBS modes supported by the terminal to a base station, and the base station transmits information on MBS modes that are supported by the base station among the MBS modes supported by the terminal, to the terminal (S110). MBS capability is exchanged between the base station and the terminal through this process. The terminal may transmit MBS mode information through a registration request (REG-REQ) message for requesting registration of network entry or network re-entry. The base station may transmit MBS mode information through a registration response (REG-RSP) message to REG-REQ message.

Next, the base station transmits a connection establishment request message for establishing MBS connection to the terminal, and the terminal transmits a response message thereto to the base station (S120). A dynamic service addition request (DSA-REQ) message may be used as the connection establishment request message, and a dynamic service addition response (DSA-RSP) message may be used as the response message to the connection establishment request message. Meanwhile, the MBS connection establishment request may be initiated by the terminal. In this case, the terminal may transmit the DSA-REQ message to the base station, and the base station may transmit the DSA-RSP message to the terminal.

Next, the terminal receives an MBS configuration (MBS-CFG) message transmitted from the base station and acquires MBS configuration information for an MBS operation (S130). The terminal acquires an MBS MAP based on the MBS configuration information (S140), and receives the MBS from the base station by receiving the MBS MAP based on information of the MBS MAP (S150).

The terminal may use an MBS carrier to receive the MBS. Hereinafter, carrier switching in this case will be described with reference to FIG. 2 to FIG. 4.

Figure 2:
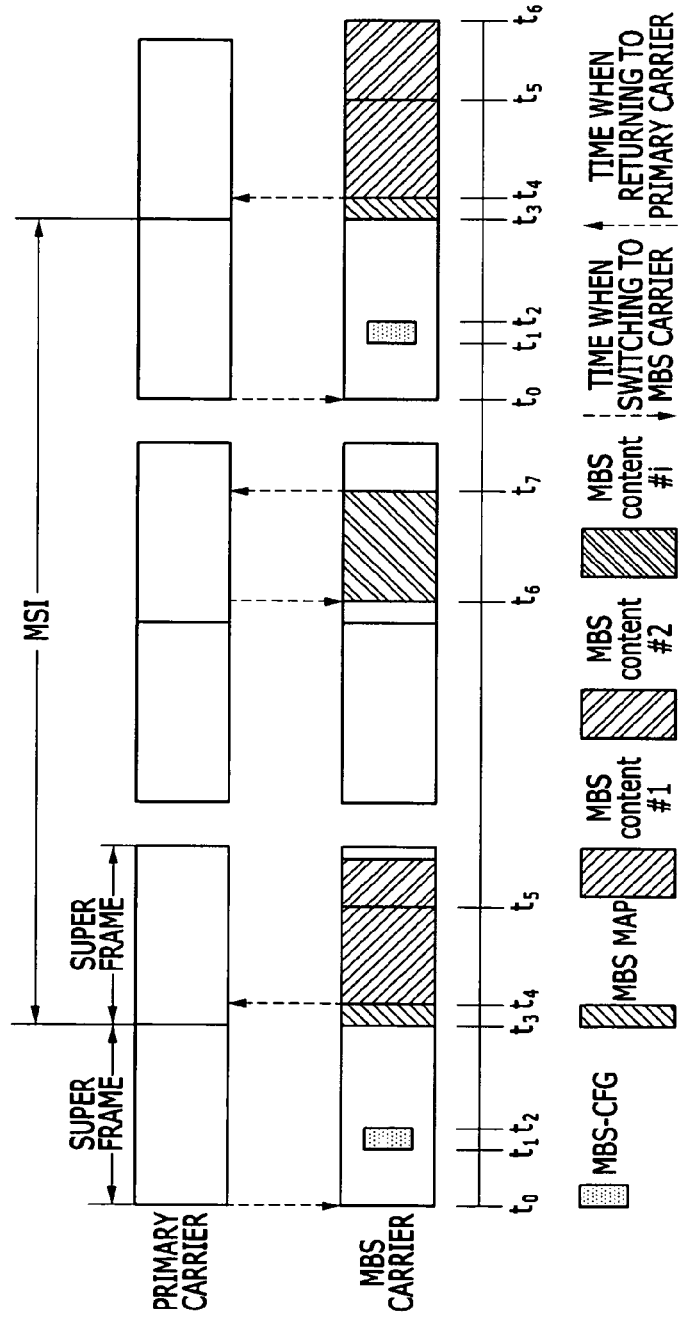
FIG. 2 is a drawing showing carrier switching according to an embodiment of the present invention.
Figure 3:
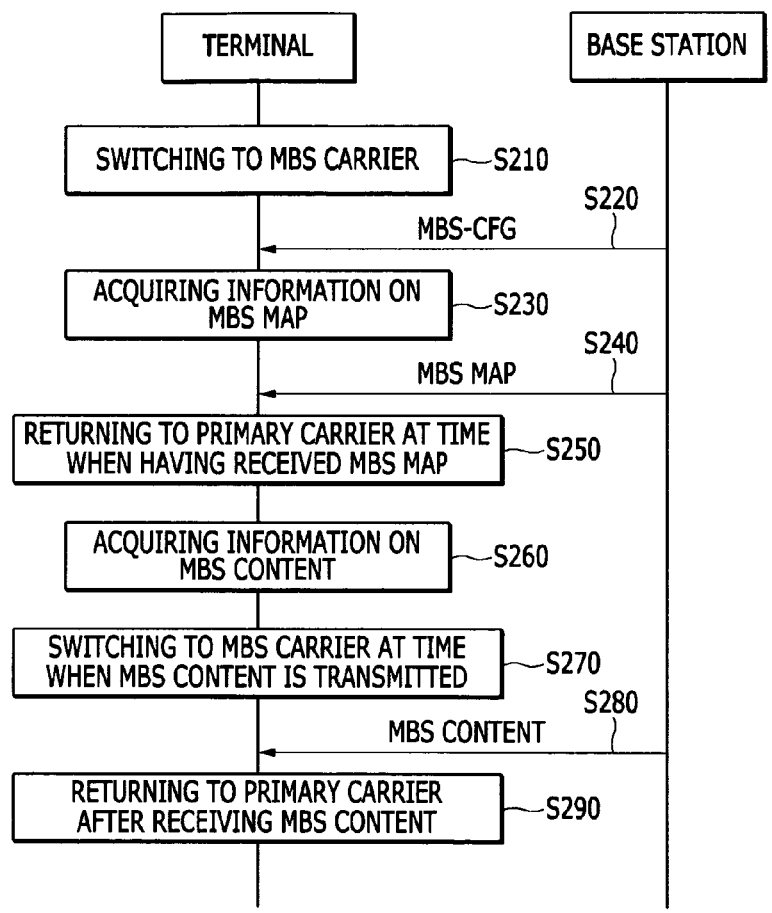
FIG. 3 to FIG. 5 are flowcharts showing a carrier managing method according to an embodiment of the present invention, respectively.
Figure 4:
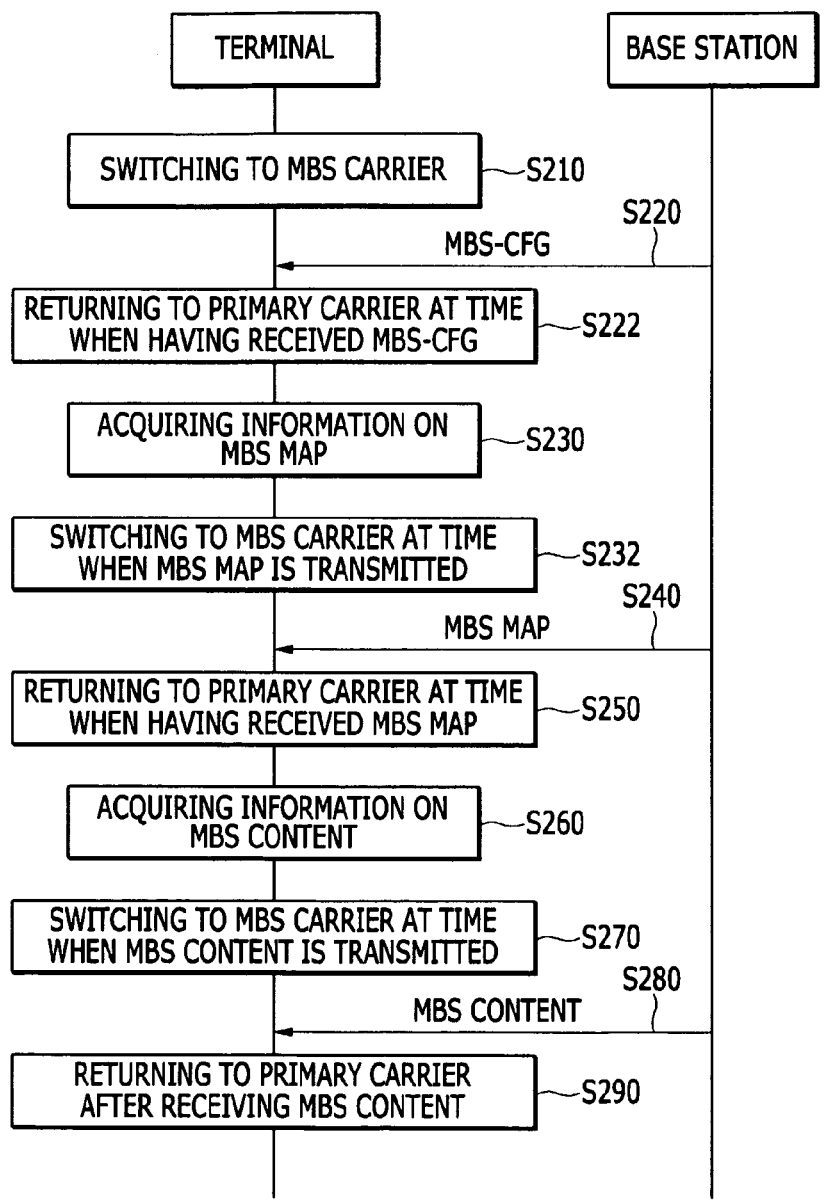
Figure 5:
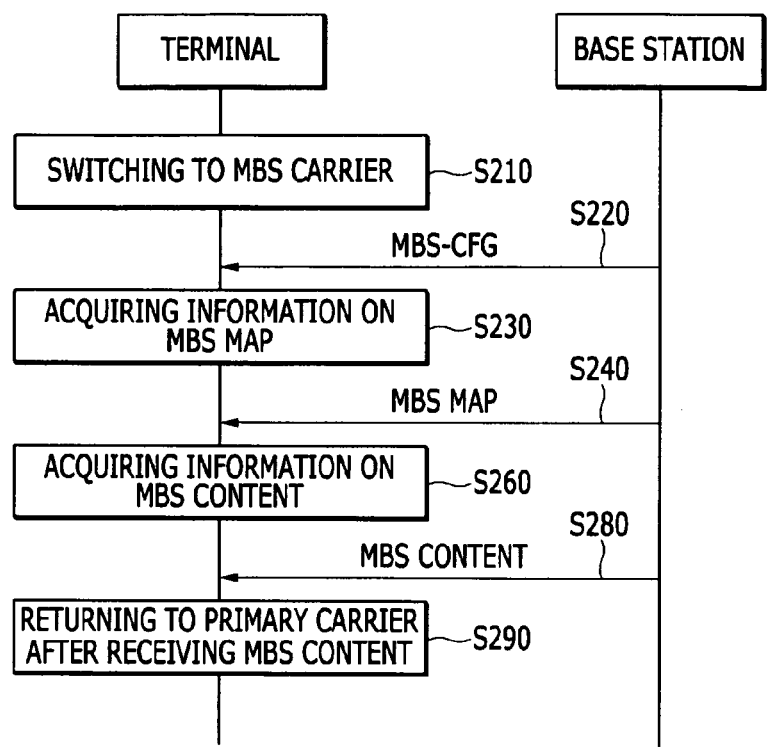

FIG. 2 is a drawing showing carrier switching according to an embodiment of the present invention, and FIG. 3 to FIG. 5 are flowcharts showing a carrier managing method according to an embodiment of the present invention, respectively.

Referring to FIG. 2 and FIG. 3, when a terminal wants to receive an MBS through an MBS carrier, it switches to the MBS carrier before an MBS-CFG message is transmitted (S210). Since a transmission time of the MBS-CFG message has been defined between a base station and the terminal, for example as expressed in Equation 1, the terminal can recognize the transmission time of the MBS-CFG message. Alternatively, the base station may provide the terminal with the transmission time of the MBS-CFG message. In this case, the base station may provide a frame or a subframe as well as a superframe on which the MBS-CFG message is transmitted. The superframe includes a plurality of frames, and each frame includes a plurality of subframes. The terminal can switch to the MBS carrier at a time t0 corresponding to the superframe on which the MBS-CFG is transmitted based on information provided by the base station or the predefined time, or at a time t1 corresponding to the frame or the subframe on which the MBS-CFG is transmitted.

$$N_{superframe} \text{ modulo } 32 == 31 \qquad \text{[Equation 1]}$$

The terminal receives the MBS-CFG message through the MBS carrier (S220), and acquires information on an MBS MAP based on the MBS-CFG (S230). Subsequently, the terminal receives the MBS MAP (S240), and returns to a primary carrier at a time t4 when it has received the MBS MAP (S250). The terminal acquires information on a resource, on which a content (MBS content #1) corresponding to the MBS that the terminal joins is transmitted, based on the MBS MAP (S260), and switches to the MBS carrier at a time t6 when the corresponding content is transmitted (S270). Next, the terminal receives the MBS content (S280), and returns to the primary carrier at a time t7 when it has received the MBS content (S290).

This operation may be performed for each MBS scheduling interval (MSI) consisting of a plurality of superframes.

While the terminal maintains a connection with the base station through the primary carrier after returning to the primary carrier, the terminal can receive downlink data from the base station and transmit uplink data to the base station using the primary carrier. As described above, according to an embodiment of the present invention, since the base station and the terminal manage a time at which the terminal stays on the MBS carrier, services other than the MBS can be provided.

Referring to FIG. 4, differently from FIG. 2 and FIG. 3, the terminal may return to the primary carrier at a time (t2 of FIG. 3) when it has received the MBS-CFG message (S222). The terminal may switch to the MBS carrier at a time (t3 of FIG. 3), when the MBS MAP is transmitted, based on the acquired MBS MAP information (S232).

Referring to FIG. 5, when an MBS content (MBS content #1) that is adjacent to the MBS MAP in FIG. 3 is the content corresponding to the MBS that the terminal joins, the terminal may return to the primary carrier after receiving the MBS MAP, differently from FIG. 2 and FIG. 4. The terminal may stay on the MBS carrier during a certain threshold period until receiving the MBS content (MBS content #1), and return to the primary carrier at a time (t5 of FIG. 3) when the threshold period passes, i.e., after receiving the MBS content (MBS content #1) (S290).

As described above, according to an embodiment of the present invention, the base station and the terminal may manage a period in which the terminal stays on the MBS carrier and a time when the terminal returns to the primary carrier, based on at least one of the following methods.

1. In some embodiments, the base station may manage a period in which the terminal stays on the MBS carrier by a certain pattern, and vary a period of the pattern. That is, the base station may extend or reduce the period in which the terminal stays on the MBS carrier. In this case, the base station may determine the pattern based on the transmission times of the MBS-CFG message, the MBS MAP, and the MBS content.

2. In some embodiments, the base station may notify the terminal that the terminal should return to the primary carrier immediately after receiving MBS-associated data through the MBS carrier. Accordingly, the terminal may switch to the MBS carrier at a time when it receives the MBS-associated data, and return to the primary carrier immediately after receiving the MBS-associated data through the MBS carrier.

3. In some embodiments, the base station may notify the terminal of the threshold period such that the terminal returns to the primary carrier after the terminal receives the MBS-associated data and then the threshold period passes. Accordingly, the terminal may stay on the MBS carrier during the threshold period after it switches to the MBS carrier and receives the MBS-associated data, and return to the primary carrier after the threshold period passes. As a result, the terminal can receive additional MBS-associated data that is provided during the threshold period, without the carrier switching.

4. In some embodiments, the base station may add a field to the MBS-associated data, and notify the terminal of a time when the terminal should return to the primary carrier through the field. The terminal can return to the primary carrier with reference to the field.

5. In some embodiments, the base station may transmit a message to the terminal whenever the terminal switches to the MBS carrier or returns to the primary carrier. The message includes a time when the terminal should switch to the MBS carrier and/or a time when the terminal should return to the primary carrier.

Hereinafter, a carrier managing apparatus for performing a carrier managing method according to an embodiment of the present invention will be described with reference to FIG. 6.

Figure 6:
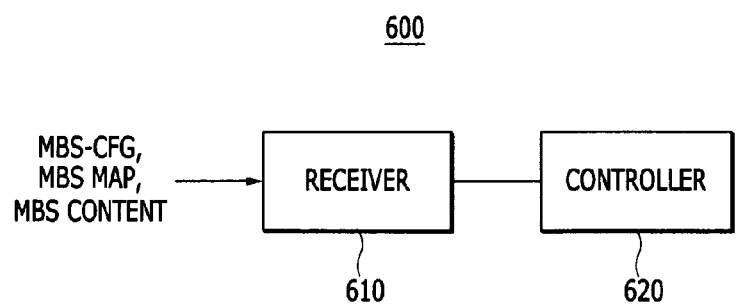
FIG. 6 is a block diagram of a carrier managing apparatus according to an embodiment of the present invention.

FIG. 6 is a block diagram of a carrier managing apparatus according to an embodiment of the present invention.

Referring to FIG. 6, a carrier managing apparatus 600 of a terminal includes a receiver 610 and a controller 620.

The receiver 610 receives MBS-associated data such as an MBS-CFG message, an MBS MAP, and MBS content that are transmitted from the base station through an MBS carrier, and receives other data transmitted from the base station through a primary carrier. The controller 620 manages the multi-carrier, thereby switching to the MBS carrier to receive the MBS-associated data and returning to the primary carrier after receiving the MBS-associated data. The controller 620 switches from the primary carrier to the MBS carrier based on a transmission time of the MBS-associated data. The controller 620 returns to the primary carrier based on at least one among a time when the terminal has received the MBS-associated data, a time when the terminal receives the MBS-associated data and then a threshold period passes, a time that is defined on a certain field of the MBS-associated data, a time that is defined on a message notified from the base station, and a time according to a pattern that is defined by the base station.

As described above, according to an embodiment of the present invention, the base station and the terminal manage a time when the terminal returns to the primary carrier from the MBS carrier, thereby providing services other than the MBS.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of managing carriers in a terminal of a multi-carrier system, the method comprising:
switching from a primary carrier to a multicast and broadcast service (MBS) carrier for an MBS;
receiving MBS-associated data from a base station through the MBS carrier;
returning to the primary carrier from the MBS carrier after receiving the MBS-associated data; and
communicating with the base station through the primary carrier,
wherein the terminal switches to the MBS carrier periodically based on a variable pattern of a time period in which the terminal stays on the primary carrier, and
wherein the MBS-associated data includes an MBS configuration message, an MBS MAP, and MBS content.

2. The method of claim 1, wherein:
the MBS configuration message includes information on the MBS MAP; and
the MBS MAP includes information on the MBS content.

3. The method of claim 2, wherein switching to the MBS carrier includes switching to the MBS carrier at a time corresponding to a superframe, a frame, or a subframe when the MBS configuration message is transmitted.

4. The method of claim 3, wherein returning to the primary carrier includes returning to the primary carrier after receiving the MBS configuration message or after the MBS configuration message is received and a threshold period passes.

5. The method of claim 3, wherein returning to the primary carrier includes returning to the primary carrier after receiving the MBS MAP or after the MBS MAP is received and a threshold period passes.

6. The method of claim 3, wherein returning to the primary carrier includes returning to the primary carrier after receiving the MBS content or after the MBS content is received and a threshold period passes.

7. The method of claim 3, wherein receiving the MBS-associated data includes receiving the MBS configuration message and the MBS MAP while staying on the MBS carrier.

8. The method of claim 3, wherein receiving the MBS-associated data includes receiving the MBS configuration message, the MBS MAP, and the MBS content while staying on the MBS carrier.

9. The method of claim 2, wherein the MBS-associated data further includes a field for a time when the terminal returns to the primary carrier.

10. The method of claim 1, further comprising receiving a message including at least one of a time when the terminal switches to the MBS carrier and a time when the terminal returns to the primary carrier, from the base station.

11. The method of claim 1, further comprising:
transmitting information on MBS modes supported by the terminal through the primary carrier;
receiving information on MBS modes supported by the base station through the primary carrier; and
performing MBS connection establishment procedure by exchanging MBS connection establishment request message and MBS connection establishment response message through the primary carrier with the base station.

12. A method of managing carriers of a terminal in a base station of a multi-carrier system, the method comprising:
transmitting a multicast broadcast service (MBS)-associated data to a terminal as the terminal switches from a primary carrier to an MBS carrier for the MBS; and
communicating with the terminal through the primary carrier as the terminal returns to the primary carrier from the MBS carrier after receiving the MBS-associated data,
wherein the terminal switches to the MBS carrier periodically based on a variable pattern of a time period in which the terminal stays on the primary carrier, and
wherein the MBS-associated data includes an MBS configuration message, an MBS MAP, and MBS content.

13. The method of claim 12, further comprising managing a period in which the terminal returns to the primary carrier after switching to the MBS carrier based on a certain pattern.

14. The method of claim 12, further comprising managing the carriers such that the terminal returns to the primary carrier after receiving the MBS-associated data.

15. The method of claim 12, further comprising managing the carriers such that the terminal returns to the primary carrier after the terminal receives the MBS-associated data and a threshold period passes.

16. The method of claim 12, wherein the MBS-associated data includes a field for a time when the terminal returns to the primary carrier.

17. The method of claim 12, further comprising transmitting a message including at least one of a time when the terminal switches to the MBS carrier and a time when the terminal returns to the primary carrier, to the terminal.

18. The method of claim 12, wherein:
the MBS configuration message includes information on the MBS MAP; and
the MBS MAP includes information on the MBS content.

19. The method of claim 12, further comprising:
receiving information on MBS modes supported by the terminal through the primary carrier;
transmitting information on MBS modes supported by the base station through the primary carrier; and
performing MBS connection establishment procedure by exchanging MBS connection establishment request message and MBS connection establishment response message through the primary carrier with the terminal.

20. An apparatus for managing carriers in a terminal of a multi-carrier system, the apparatus comprising:
a controller configured to switch from a primary carrier to a multicast broadcast service (MBS) carrier for an MBS based on a transmission time of MBS-associated data, and return to the primary carrier from the MBS carrier after receiving the MBS-associated data; and
a receiver configured to receive the MBS-associated data from a base station through the MBS carrier, and receive data from the base station through the primary carrier,
wherein the terminal switches to the MBS carrier periodically based on a variable pattern of a time period in which the terminal stays on the primary carrier, and
wherein the MBS-associated data includes an MBS configuration message, an MBS MAP, and MBS content.

21. The apparatus of claim 20, wherein the controller returns to the primary carrier based on at least one among a time when the terminal has received the MBS-associated data, a time when the terminal receives the MBS-associated data and a threshold period passes, a time included in the MBS-associated data, a time included in a message transmitted from the base station, and a time according to a pattern defined by the base station.

22. The apparatus of claim 20, further comprising:
a transmitter configured to transmit information on MBS modes supported by the terminal and MBS connection establishment response message, through the primary carrier,
wherein the receiver receives information on MBS modes supported by the base station and MBS connection establishment request message, through the primary carrier.

* * * * *